United States Patent [19]

Myers

[11] 4,419,277

[45] Dec. 6, 1983

[54] TREATED POLYACETYLENE

[75] Inventor: Robert M. Myers, Holland, Pa.

[73] Assignee: Rohm and Haas Company, Philadelphia, Pa.

[21] Appl. No.: 246,535

[22] Filed: Mar. 23, 1981

[51] Int. Cl.$^3$ .............................................. H01B 1/02
[52] U.S. Cl. .................................. 252/500; 525/343; 525/384; 525/385
[58] Field of Search ............... 252/500, 518, 519, 404, 252/400 A, 406, 407; 357/8; 528/494, 495, 491, 487, 485; 526/285; 525/343, 384, 385; 524/304, 347, 348, 580

[56] References Cited

U.S. PATENT DOCUMENTS

| | | | |
|---|---|---|---|
| 3,775,177 | 11/1973 | Hayama et al. | 427/28 |
| 4,204,216 | 5/1980 | Heeger et al. | 252/512 |
| 4,222,903 | 9/1980 | Heeger et al. | 252/518 |
| 4,356,301 | 10/1982 | Gleim | 528/495 |

OTHER PUBLICATIONS

"Stabilization of Linear Acetylenic Polymers", Bantasher, V. A. et al., Chem. Abst., 71, 13816m (1969).

Primary Examiner—Josephine Barr
Attorney, Agent, or Firm—Marc S. Adler

[57] ABSTRACT

A process for reducing doped polyacetylene crosslinking and embrittlement comprises treating the polyacetylene with a material selected from the class consisting of (a) hindered phenols; (b) alkyl ethers of hydroquinone, wherein the alkyl group has from 1 to about 12 carbon atoms; and (c) dialkyl thiodipropionates wherein each of said alkyl groups has from 1 to about 18 carbon atoms and each alkyl group may be the same or different. A doped polyacetylene composition exhibiting enhanced resistance to polyacetylene crosslinking and embrittlement contains a doped polyacetylene and a material, as defined above, associated with said doped polyacetylene.

27 Claims, No Drawings

TREATED POLYACETYLENE

BACKGROUND OF THE INVENTION

Polyacetylene, its preparation and doping is described in U.S. Pat. Nos. 4,204,216 and 4,222,903. The disclosures of these patents are incorporated herein by reference.

Polyacetylene has valuable electrical properties for a wide variety of uses. These properties are enhanced by the doping of polyacetylene. However, when polyacetylene is prepared and doped, within a short time after its preparation and doping, the polyacetylene becomes brittle and also loses a portion of its enhanced electrical conductivity properties. Even when a polyacetylene powder is prepared and doped, the enhanced electrical conductivity of such doped powder decreases after a short period of time and the doped powder itself becomes modified so that the preparation of formed articles from the doped powder becomes difficult. One possible explanation for the loss of enhanced conductivity and the embrittlement of a doped polyacetylene formed material, such as a film is due to isomerization of cis-polyacetylene to trans-polyacetylene. However, it is known that cis-polyacetylene, although generally considered stable at temperatures of from about $-78°$ C. to $0°$ C., does isomerize slowly, even at $-78°$ C., to trans-polyacetylene. At temperatures in excess of $0°$ C., isomerization of cis-polyacetylene to transpolyacetylene is accelerated. During this conversion, free radicals may be formed which may crosslink or otherwise react with available oxygen. The reaction with available oxygen is believed to contribute to the embrittlement of, for example, a doped polyacetylene film by the formation of carbonyl and hydroxyl groups. These groups disrupt the conjugation of the polyacetylene double bonds and thereby decrease the enhanced electrical conductivity of the doped polyacetylene. Whenever cis-polyacetylene is isomerized to trans-polyacetylene, whether in a doped or undoped state, there will always be the formation of free radicals due to the isomerization mechanism. A discussion of the preparation of polyacetylene films and the isomerization of such films is set forth in the Journal of Polymer Science, Volume 12, pages 11 through 20, Shirakawa, et al (1974).

Embrittlement of a doped cis-polyacetylene film or formed article can be delayed by storing the doped film or formed article at a low temperature ($-78°$ C. to $0°$ C.) under an inert gas such as nitrogen, argon or helium.

Although it is known that the cis-polyacetylene is more flexible than the trans-polyacetylene, the trans-polyacetylene has greater intrinsic electrical conductivity properties and the trans-form is thermodynamically more stable. The free radicals which may be formed during isomerization of cis- to trans-polyacetylene also trap oxygen and reduce the electrical conductivity of the doped polyacetylene (whether cis- or trans- if oxygen is present because it is believed that these free radicals form carbonyl and hydroxyl groups). Although, the state of the art is still such that the formation of these free radicals cannot be eliminated, if the presence of oxygen can be eliminated, then an aggravation of the results of free radical formation can be avoided. Thus, the problems of embrittlement and loss of electrical conductivity can be alleviated.

The previous practice of avoiding embrittlement involved preparation of cis-polyacetylene and storage of the cis-polyacetylene, whether doped of undoped, at low temperatures of from $-78°$ C. to $0°$ C. under vacuum or an atmosphere of an inert gas. Such procedures are cumbersome in any practical ambient environment. Therefore, the utility of doped polyacetylene in applications requiring electrical conductivity is severely limited by the use of those procedures.

Any other approach to the aforesaid problem of the effects of oxygen must take into consideration the affinity of polyacetylene for oxygen. Thus, any material which would remove oxygen from the system must compete with the doped polyacetylene for the removal of such oxygen and must have a greater affinity for oxygen than the polyacetylene. Stated otherwise, any material which would remove oxygen must be able to compete successfully with polyacetylene for the oxygen present.

It is an object of this invention, therefore, to reduce doped polyacetylene crosslinking and embrittlement.

Another object of this invention is to provide a process for substantially preventing oxygen from contacting doped polyacetylene by providing a material which will successfully compete with the polyacetylene for the available oxygen.

Still another object of this invention is to provide a process for maintaining the electrical conductivity of polyacetylene.

A further object is to provide a doped polyacetylene composition having enhanced resistance to polyacetylene crosslinking and embrittlement.

Other objects and advantages will become apparent from the following more complete description and claims.

DETAILED DESCRIPTION

Broadly, this invention contemplates a process for reducing doped polyacetylene crosslinking and embrittlement comprising the steps of treating said polyacetylene with a material selected from the class consisting of:

(a) hindered phenols;

(b) alkyl ethers of hydroquinone wherein said alkyl group has from 1 to about 12 carbon atoms; and (c) dialkylthiodipropionates wherein each of said alkyl groups has from 1 to about 18 carbon atoms and each alkyl group may be the same or different; and mixtures thereof.

This invention also contemplates a doped polyacetylene composition exhibiting enhanced resistance to polyacetylene crosslinking and embrittlement comprising doped polyacetylene and a material associated with said polyacetylene, said material being selected from the class consisting of:

(a) hindered phenols;

(b) alkyl ethers of hydroquinone wherein said alkyl group has from 1 to about 12 carbon atoms; and (c) dialkylthiodipropionates wherein each of said alkyl groups has from 1 to about 18 carbon atoms and each alkyl group may be the same or different; and mixtures thereof.

The doped polyacetylene which is to be protected may be in the form of a powder, film or a foam-like material (hereinafter referred to as a foam.) The preparation of polyacetylene foams is described in Journal of Polymer Science; Polymer Letters Edition, Volume 17, pages 779–786, Wnek. Basically, polyacetylene foams may be prepared by polymerizing acetylene gas in the presence of a Ziegler-Natta type catalyst at concentrations that are less then normally employed when forming a film. After the polyacetylene gel is obtained, solvent is removed under vacuum from the gel and the solvent is replaced with benzene. The benzene in the gel is then frozen and the benzene is then sublimed to prepare the polyacetylene foam.

The materials which may be used to give the doped polyacetylene enhanced resistance to crosslinking and embrittlement may be either normally liquid or normally solid materials. If the protecting material is normally a liquid, then the doped polyacetylene may be immersed in the protecting material itself for a sufficient period of time to enable the protecting material to be adequately absorbed or otherwise associate itself with the doped polyacetylene.

If the protecting material is normally a solid, then the protecting material may be dissolved in a suitable solvent. The solvent used for the protecting material is one which will not adversely affect the doped polyacetylene, such as by removing dopant therefrom. Among the solvents which may be used are ethylene glycol, methyl alcohol, ethyl alcohol, dimethylsulfoxide, tetrahydrofuran, dimethylformamide, acetonitrile, glyme, diglyme, dimethyl acetamide, N-methyl pyrrolidone, sulfolane and the like.

Even when a normally liquid protecting material is used, such protecting material may also be dissolved in a suitable solvent, such as is set forth above, in order to reduce the concentration thereof, if such is desired.

The concentration of the protecting material in the solvent may vary widely. Generally, it is preferred that as much of the protecting material be dissolved in the solvent as is possible because such greater concentration will reduce the time necessary for the doped polyacetylene to associate itself with the protecting material and thus achieve enhanced resistance against crosslinking and embrittlement.

Although any concentration of protecting material in solvent may be used, it is generally preferred that the protecting material be present, in solution, in an amount of at least about 10% by weight, based on the weight of the entire protecting solution. It has generally been found satisfactory to use a protecting solution wherein the solution has about 20% by weight of the protecting material dissolved therein. However, solutions of 30%, 70% or even greater, may also be used. As stated previously, when the protecting material is a liquid, the liquid protecting material, without any solvent, may be used to treat the doped polyacetylene.

The doped polyacetylene is generally immersed in the protecting material solution or in the liquid protecting material itself for a period of time of from about 8 hours to about 24 hours. It should be understood however that the length of time the doped polyacetylene is immersed in the protective solution or liquid protective material, will also depend upon the concentration of the protecting solution being used and the rate of diffusion of the protecting material into the polyacetylene. Thus, when a 70% solution of a protecting material (whether liquid or solid) is used, the time of exposure of the doped polyacetylene in said solution could be less than when the doped polyacetylene is immersed in a solution of, for example, a 10% concentration of protecting material.

It is generally satisfactory that a 20%, by weight protecting material solution be used and that the doped polyacetylene be immersed in that solution for a period of from about 16 hours to about 24 hours. The doped polyacetylene may be treated with the protecting material until the doped polyacetylene no longer absorbs any additional material.

When a doped polyacetylene foam is to be protected, this may also be accomplished in the following manner. When the foam material is being prepared and after solvent has been removed from the polyacetylene gel, the solvent is replaced with a sublimable liquid in which is dissolved the protecting material. The gel, having the sublimable liquid-protective material solution may then be allowed to stand, although such is not necessary to assure the association of the protecting material with the doped polyacetylene. Thereafter, the sublimable liquid, such as benzene, is then frozen and the sublimable liquid is then sublimed. The resultant doped polyacetylene foam will contain substantially all of the protective material which had been dissolved in the sublimable liquid. In this manner, even greater amounts of protective material may be associated with the doped polyacetylene foam then would be associated if the polyacetylene foam is immersed in a solution of a protective material and then removed from the solution. The above method may also be used when protecting doped polyacetylene film or powder because of the porosity of such film and powder.

The protective materials which may be used are hindered phenols; alkyl ethers of hydroquinones and dialkylthiodipropionates, and mixtures thereof.

Among the hindered phenols which may be used are 4-dodecyloxy-2 hydroxybenzophenone; 2,6 di-t-butyl-4-methylphenol; octadecyl 3-(3,5-di-t-butyl-4-hydroxyphenyl)propionate; Nickel-bis[O-ethyl (3,5-di-t-butyl-4 hydroxybenzyl)]phosphonate: sulfur containing hindered phenols such as that sold by American Cyanamid Company under the trademark Cyanox 1729; and the like.

Exemplary of hydroquinone ethers which may be used are the methyl, ethyl, propyl, butyl and 2-ethyl-hexyl ethers of hydroquinone; and the like.

Each of the alkyl groups of the dialkylthiodipropionates which may be used, may have from 1 to about 18 carbon atoms and may be the same or different.

Among the dialkylthiodipropionates which may be used are di-stearyl thiodipropionate; di-butyl thiodipropionate; di-decyl thiodipropionate and the like.

The compositions, according to this invention, exhibit enhanced resistance to crosslinking and embrittlement. Although the nature of the association of the protecting materials with the doped polyacetylene is not understood, it is possible that the protecting material is absorbed by the doped polyacetylene, while not interfering with the dopant, in such a way as to be an internal part of the doped polyacetylene particle or matrix.

In the examples which follow, the initial conductivity is determined periodically during a period of about 1,000 hours. Conductivity is calculated from the method described in ASTM F 43, as applied to a polyacetylene film. The decay rate is determined from an empirical semi-logarithmic rate equation (similar to the Arrhenius equation.)

The semiconductor lifetime, measured in years, is calculated from the aforementioned empirical equation by setting the conductivity of the doped and protected polyacetylene film equal to $10^{-7}$ (ohm-cm)$^{-1}$ (the lower limit of semiconductor conductivity) and solving for time, measured in years.

The halflife, measured in days, is determined using the equation:

Halflife = the natural logarithm of 0.5 divided by the decay rate obtained from the aforementioned empirical equation.

In order to more fully illustrate the nature of this invention and the manner of practicing the same, the following examples are presented.

GENERAL PROCEDURE FOR EXAMPLES

Protective solutions of 20% by weight of a protective material in tetrahydrofuran are made and an iodine doped polyacetylene film, containing approximately 50%, by weight, of iodine dopant, is immersed in the protective solution for 24 hours. The film is then removed from the solution and dried in a dry nitrogen stream.

Samples are prepared by cutting the protected, doped polyacetylene into one-half inch by three inches strips. Two one-half inch wide aluminum foil strips are each separately attached, using conducting silver paste, to an end of the protected, doped polyacetylene in a manner such as to leave an area measuring one inch by one-half inch of the protected, doped polyacetylene, free of the aluminum foil. Each of both ends of the polyacetylene film thus has a separate strip of aluminum foil. The samples are encased in clear adhesive tape with the aluminum foil strips extending beyond the tape on both ends of the film. The samples are then connected to a Keithley 530 "TYPE-ALL" system and conductivity is measured at very low currents (10 to 100 microamps). A control which is not treated with a protective material is also prepared and tested as set forth above. The aforedescribed calculations are then made. The results are as follows.

TABLE I

| | Examples 1-8 | | | |
|---|---|---|---|---|
| Protective material | Initial Conductivity $10^{-3}[OHm-Cm]^{-1}$ | Decay Rate $10^{-3}$/hour | Semiconductor lifetime-years | Semiconductor half life-days |
| 1. A hindered phenol with sulfur (Cyanox 1729- American Cyanamid Company) | 73 | 2.85 | 0.54 | 10 |
| 2. Nickel-bis [O—ethyl (3,5-di-t-butyl-4-hydroxybenzyl)] | 70 | 3.13 | 0.49 | 9.2 |
| 3. Octadecyl-,3-(3,5-di-t-butyl-4-hydroxyphenyl) propionate | 200 | 4.36 | 0.38 | 6.6 |
| 4. 2,6-di-t-butyl-4 methylphenol | 220 | 4.43 | 0.38 | 6.5 |
| 5. monomethyl ether of hydroquinone | 200 | 4.56 | 0.36 | 6.3 |
| 6. 4-dodecyloxy-2-hydroxybenzophenone | 87 | 4.62 | 0.34 | 6.2 |
| 7. di-stearyl thiodipropionate | 9.6 | 5.29 | 0.25 | 5.4 |
| 8. Control (no protective material) | 23 | 7.22 | 0.19 | 4.0 |

While this invention has been described in terms of certain preferred embodiments and illustrated by means of specific examples the invention is not to be contrued as limited except as set forth in the following claims.

I claim:

1. A process for reducing doped polyacetylene crosslinking and embrittlement comprising treating said polyacetylene with a material selected from the class consisting of:
   (a) hindered phenols having at least one alkyl or alkoxy group of from about 4 to about 12 carbon atoms, said alkyl or alkoxy group being in a position ortho and/or para to the hydroxy group on the benzene ring;
   (b) alkyl ethers of hydroquinone, wherein said alkyl group has from 1 to about 12 carbon atoms; and
   (c) dialkyl thiodipropionates wherein each of said alkyl groups has from 1 to about 18 carbon atoms and each alkyl group may be the same or different; and mixtures thereof.

2. A process according to claim 1 wherein said polyacetylene is either p-doped, n-doped or has a p-n junction.

3. A process according to claim 1 wherein said material is dissolved in a solvent.

4. A process according to claim 3 wherein said solution is at least a 10% solution, by weight, of said material in said solvent.

5. A process according to claim 1 wherein said polyacetylene is a film.

6. A process according to claim 1 wherein said polyacetylene is a powder.

7. A process according to claim 1 wherein said polyacetylene is treated with said material for a period of time of at least about 8 hours.

8. A process according to claim 1 wherein said polyacetylene is treated with said material for a period of time of from about 8 to about 24 hours.

9. A process according to claim 1 wherein said polyacetylene is treated with said material until said polyacetylene no longer absorbs any additional material.

10. A process according to claim 1 wherein said polyacetylene is treated with said material at ambient temperature and pressure.

11. A process according to claim 1 wherein said material is the methyl ether of hydroquinone.

12. A process according to claim 1 wherein said material is nickel-bis[O-ethyl(3,5-di-t-butyl-4 hydroxybenzyl)]phosphonate.

13. A process according to claim 1 wherein said material is 4-dodecyloxy-2 hydroxybenzophenone.

14. A process according to claim 1 wherein said material is 2,6-di-t-butyl-4-methylphenol.

15. A process according to claim 1 wherein said material is octadecyl-3-(3,5-di-t-butyl-4 hydroxyphenyl)propionate.

16. A process for reducing doped polyacetylene crosslinking and embrittlement comprising treating said doped polyacetylene with distearyl thiodipropionate.

17. A doped polyacetylene composition exhibiting enhanced resistance to polyacetylene crosslinking and embrittlement comprising doped polyacetylene and a material associated with said polyacetylene, said material being selected from the class consisting of:
   (a) hindered phenols having at least one alkyl or alkoxy group of from about 4 to about 12 carbon atoms, said alkyl or alkoxy group being in a position ortho and/or para to the hydroxy group on the benzene ring;
   (b) alkyl ethers of hydroquinone wherein said alkyl group has from 1 to about 12 carbon atoms; and (c) dialkylthiodipropionates wherein each of said alkyl groups has from 1 to about 18 carbon atoms and each alkyl group may be the same or different; and mixtures thereof.

18. A composition according to claim 17 wherein said polyacetylene is a film.

19. A composition according to claim 17 wherein said polyacetylene is a powder.

20. A composition according to claim 17 wherein said polyacetylene is a foamed material.

21. A composition according to claim 17 wherein said material is the methyl ether of hydroquinone.

22. A composition according to claim 17 wherein said material is nickel-bis[O-ethyl(3,5-di-t-butyl-4 hydroxybenzyl)]phosphonate.

23. A composition according to claim 17 wherein said material is 4-dodecyloxy-2 hydroxybenzophenone.

24. A composition according to claim 17 wherein said material is 2,6-di-t-butyl-4-methylphenol.

25. A composition according to claim 17 wherein said material is octadecyl-3-(3,5-di-t-butyl-4 hydroxyphenyl)propionate.

26. A doped polyacetylene composition exhibiting enhanced resistance to polyacetylene crosslinking and embrittlement comprising doped polyacetylene and distearyl thiodipropionate.

27. A doped polyacetylene composition exhibiting enhanced resistance to polyacetylene crosslinking and embrittlement comprising polyacetylene and a material associated with said polyacetylene, said material being selected from the class consisting of:
 (a) hindered phenols having at least one alkyl or alkoxy group of from about 4 to about 12 carbon atoms, said alkyl or alkoxy group being in a position ortho and/or para to the hydroxy group on the benzene ring;
 (b) alkyl ethers of hydroquinone wherein said alkyl group has from 1 to about 12 carbon atoms; and
 (c) dialkylthiodipropionates wherein each of said alkyl groups has from 1 to about 18 carbon atoms and each alkyl group may be the same or different; and mixtures thereof.

* * * * *